United States Patent [19]

Hisa

[11] Patent Number: 5,551,584

[45] Date of Patent: Sep. 3, 1996

[54] METHOD OF PRODUCING LAMBDA/4-SHIFTED DIFFRACTION GRATING

[75] Inventor: Yoshihiro Hisa, Itami, Japan

[73] Assignee: Mitsubishi Denki Kabushiki Kaisha, Tokyo, Japan

[21] Appl. No.: 400,960

[22] Filed: Mar. 8, 1995

[30] Foreign Application Priority Data

Jun. 21, 1994 [JP] Japan .................................. 6-138899

[51] Int. Cl.$^6$ ...................................................... B44C 1/22
[52] U.S. Cl. ................................. 216/2; 216/24; 216/41
[58] Field of Search ............................ 430/313, 321, 430/323, 329; 359/566; 216/2, 11, 12, 24, 41

[56] References Cited

U.S. PATENT DOCUMENTS

| | | | |
|---|---|---|---|
| 5,024,726 | 6/1991 | Fujiwara | 216/24 |
| 5,225,039 | 7/1993 | Ohguri | 156/656.1 X |
| 5,236,811 | 8/1993 | Fujiwara | 430/321 |

FOREIGN PATENT DOCUMENTS 361901  3/1991  Japan .

*Primary Examiner*—William Powell
*Attorney, Agent, or Firm*—Leydig, Voit & Meyer

[57] ABSTRACT

In a method of producing a $\lambda/4$-shifted diffraction grating, an image reversible resist is deposited on a substrate, the image reversible resist is exposed to an interference pattern having an intensity so that the resist is not dissolved when developed, the resist on a first region of the substrate is exposed to an interference light pattern so that only portions of the resist exposed to crests of a light intensity pattern in the interference exposure process are dissolved when developed, the resist on the first region is developed, portions of the resist on the first region remaining after the developing are exposed so that image reversal occurs in these portions when subjected to image reversal baking, the resist on a second region of the substrate is exposed to an interference light pattern so that only portions of the resist exposed opposite crests of a light intensity pattern are image reversed when subjected to image reversal baking, the resist on the first and second regions is subjected to image reversal baking, and the resist on the first and second regions is exposed and developed to remove portions in which image reversal did not occur, thereby forming a mask for a $\lambda/4$-shifted diffraction grating to be formed in the substrate.

3 Claims, 5 Drawing Sheets

Prior Art

METHOD OF PRODUCING LAMBDA/4-SHIFTED DIFFRACTION GRATING

FIELD OF THE INVENTION

The present invention relates to a method of producing a λ/4-shifted diffraction grating used in a semiconductor laser.

BACKGROUND OF THE INVENTION

FIGS. 7(a)–7(e) are sectional views illustrating process steps in a method of producing a λ/4-shifted diffraction grating disclosed in Japanese Published Patent Application No. Hei.3-6901. In the figures, reference numeral 1 designates a semiconductor substrate. An image reversible resist 2 is deposited on the substrate 1. A commercial image reversible resist may be employed. An intermediate layer 4 is deposited on the image reversible resist 2, followed by a cover resist 5. The intermediate layer 4 prevents mixing of the resists 2 and 5. The cover resist 5 comprises either a positive resist or a negative resist. Reference numeral 3 designates luminous flux of interference fringes for exposure of the resists.

An image reversible resist has the following property. That is, when it is developed after exposure, a portion of the resist exposed to light is removed in developing like a positive resist. However, when the resist is subjected to image reversal baking before developing, crosslinking, i.e., a composition change due to heat treatment, occurs in the portion exposed to light, and the exposed portion remains after developing.

A description is given of the production process.

Initially, as illustrated in FIG. 7(a), the image reversible resist 2 is deposited on the semiconductor substrate 1 to a thickness of from several hundreds of angstroms to one thousand angstroms and exposed by a two-beam interference fringe exposure technique. After the exposure, the intermediate layer 4 and the cover resist 5 are deposited as shown in FIG. 7(b). Thereafter, a prescribed portion of the cover resist 5 is removed by exposure and developing, and the intermediate layer 4 is partially removed using the remaining portion of the cover resist 5 as a mask. Then, the image reversible resist 2 is developed in a region where the cover resist 5 is absent (FIG. 7(c)). Thereafter, the region where the cover resist 5 is absent is exposed to light, followed by image reversal baking to reverse the property of the resist 2. After removal of the cover resist 5 and the intermediate layer 4, the remaining portion of the image reversible resist 2 is developed (FIG. 7(d)). In order to increase the etching rate of the image reversible resist 2 by a developer, after removal of the cover resist 5 and the intermediate layer 4, only the not-patterned portion of the resist 2 is exposed i.e., flooded with light and developed. Finally, using the patterned resist 2 as a mask, the substrate 1 is etched to transfer the pattern of the resist 2 on the substrate 1, followed by removal of the resist 2. As a result, a λ/4-shifted diffraction grating having a λ/4-shifted region in the center is produced (FIG. 7(e)).

In the prior art process of producing a λ/4-shifted diffraction grating, the deposition of the cover resist 5 and the intermediate layer 4 on the image reversible resist 2 complicates the production process.

Further, during exposure to remove a portion of the cover resist 5 in the step of FIG. 7(c), the image reversible resist 2 under the cover resist 5 is unfavorably exposed depending on the wavelength of the light used for the exposure. In the worst case, the image reversible resist 2 is completely removed when it is developed.

SUMMARY OF THE INVENTION

It is an object of the present invention to provide a relatively simple method of producing a λ/4-shifted diffraction grating that does not require a plurality of resists.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, in a method of producing a λ/4-shifted diffraction grating, an image reversible resist is deposited on a substrate on which a diffraction grating is to be formed, the image reversible resist is exposed by an interference pattern with a light intensity pattern having a plurality of crests so that the resist is not dissolved when developed, the resist on a first region of the substrate is exposed to such an extent that only portions of the resist exposed opposite the crests of the light intensity pattern in the interference exposure process are dissolvable when developed, the resist on the first region of the substrate is developed, portions of the resist on the first region of the substrate remaining after the developing are exposed so that image reversal occurs in these portions when subjected to image reversal baking, the resist on a second region of the substrate is exposed so that only portions of the resist exposed opposite the crests of the light intensity pattern in the interference exposure process are exposed so that image reversal occurs in these portions when subjected to image reversal baking, the image reversible resists on the first and second regions of the substrate are subjected to image reversal baking, the resists on the first and second regions of the substrate are exposed and developed to remove portions in which image reversal did not occur, thereby forming a resist pattern, and the substrate is etched using the resist pattern as a mask. Therefore, a λ/4-shifted diffraction grating is formed with an image reversible resist, whereby the production process is significantly simplified.

According to a second aspect of the present invention, in a method of producing a λ/4-shifted diffraction grating, an image reversible resist is deposited on a substrate on which a diffraction grating is to be formed, the image reversible resist is exposed by an interference exposure with a light intensity pattern having a plurality of crests so that the resist is not dissolved when developed, the resist on a first region of the substrate is exposed so that only portions of the resist exposed opposite the crests of the light intensity pattern in the interference exposure process are dissolvable when developed, the resist on the first region of the substrate is developed, portions of the resist on the first region of the substrate remaining after the developing and portions of the resist on a second region of the substrate exposed opposite the crests of the light intensity pattern in the interference exposure process are exposed so that image reversal occurs in these portions when subjected to image reversal baking, the image reversible resists on the first and second regions of the substrate are baked, the resists on the first and second regions of the substrate are exposed and developed to remove portions in which image reversal did not occur, thereby forming a resist pattern, and the substrate is etched using the resist pattern as a mask. Therefore, the resist on the first region of the substrate remaining after developing and the resist on the second region of the substrate are simultaneously exposed in one exposure step, so that the production process is significantly simplified.

According to a third aspect of the present invention, in the above-described method of producing a λ/4-shifted diffraction grating, an alignment mark is formed on a wafer including the substrate by exposure when the image reversible resist on the first region of the substrate is exposed, and the subsequent exposure steps are carried out using the alignment mark. Therefore, a highly-precise λ/4-shifted diffraction grating is produced.

DETAILED DESCRIPTION OF THE PREFERRED EMBODIMENTS

Figure 1:
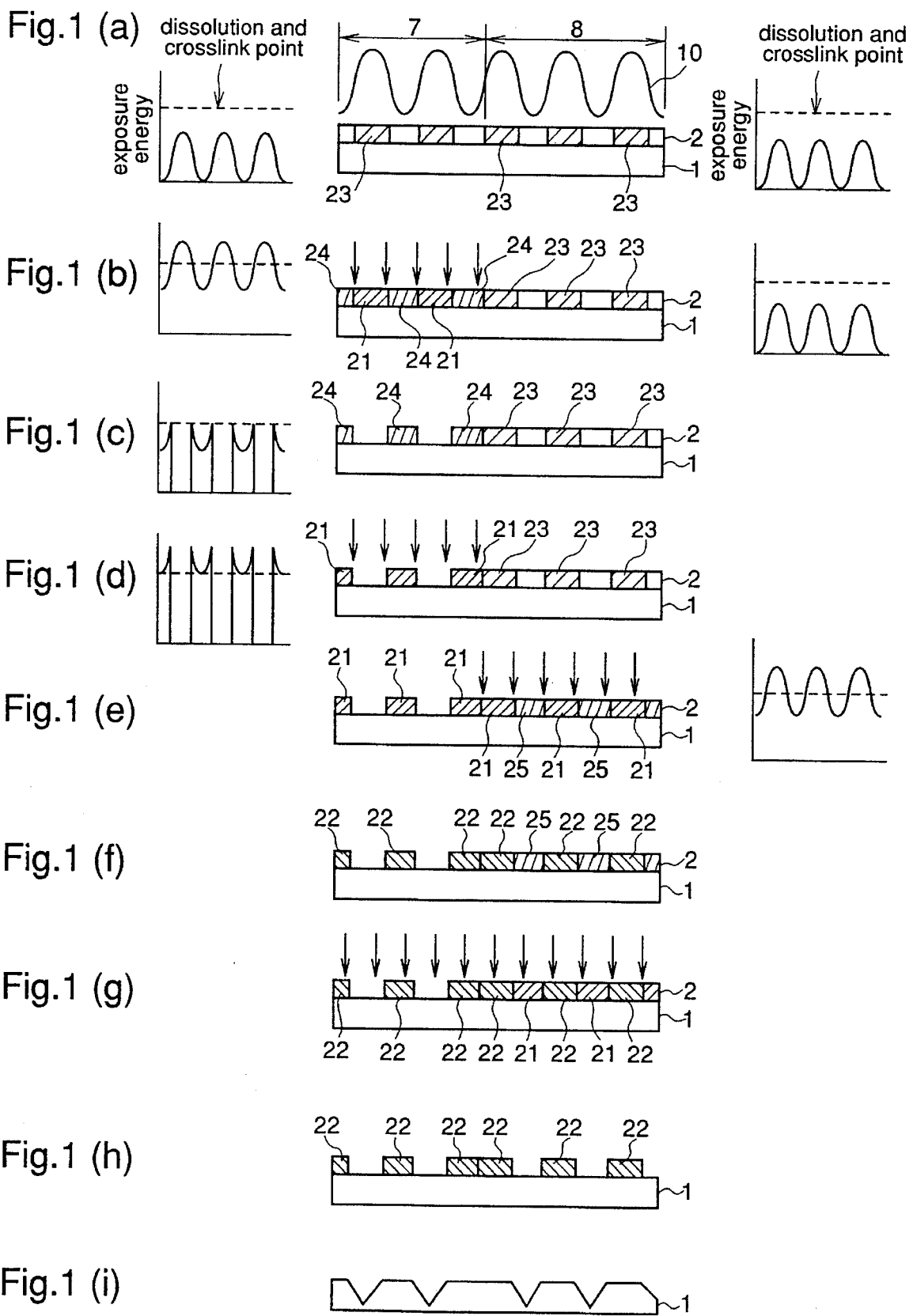
FIGS. 1(a)–1(i) are sectional views illustrating process steps in a method of producing a λ/4-shifted diffraction grating in accordance with a first embodiment of the present invention.

EMBODIMENT 1.

FIG. 1(a)–1(i) are sectional views illustrating process steps in a method of fabricating a λ/4-shifted diffraction grating according to a first embodiment of the present invention. In the figures, reference numeral 1 designates a semiconductor substrate having a first region 7 and a second region 8. An image reversible resist 2 is deposited on the semiconductor substrate 1. The image reversible resist 2 has the following property. That is, when it is developed after exposure, a portion of the resist exposed to light is removed by developing like a positive resist. However, when the resist is subjected to image reversal baking before the developing, crosslink, i.e., a composition change due to heat treatment, occurs in a portion exposed to light, and the exposed portion remains after the developing. Reference numeral 21 designates portions of the image reversible resist in which the exposure energy reaches an amount at which dissolution by developing and crosslinking by thermal treatment are possible, i.e., an amount at which image reversal processing is possible. Reference numeral 22 designates portions of the resist 2 where crosslinking occurs due to heat treatment. Reference numerals 23, 24, and 25 designate first, second, and third exposed portions of the resist 2. Reference numeral 10 designates a light intensity pattern employed in interference exposure.

Figure 6:
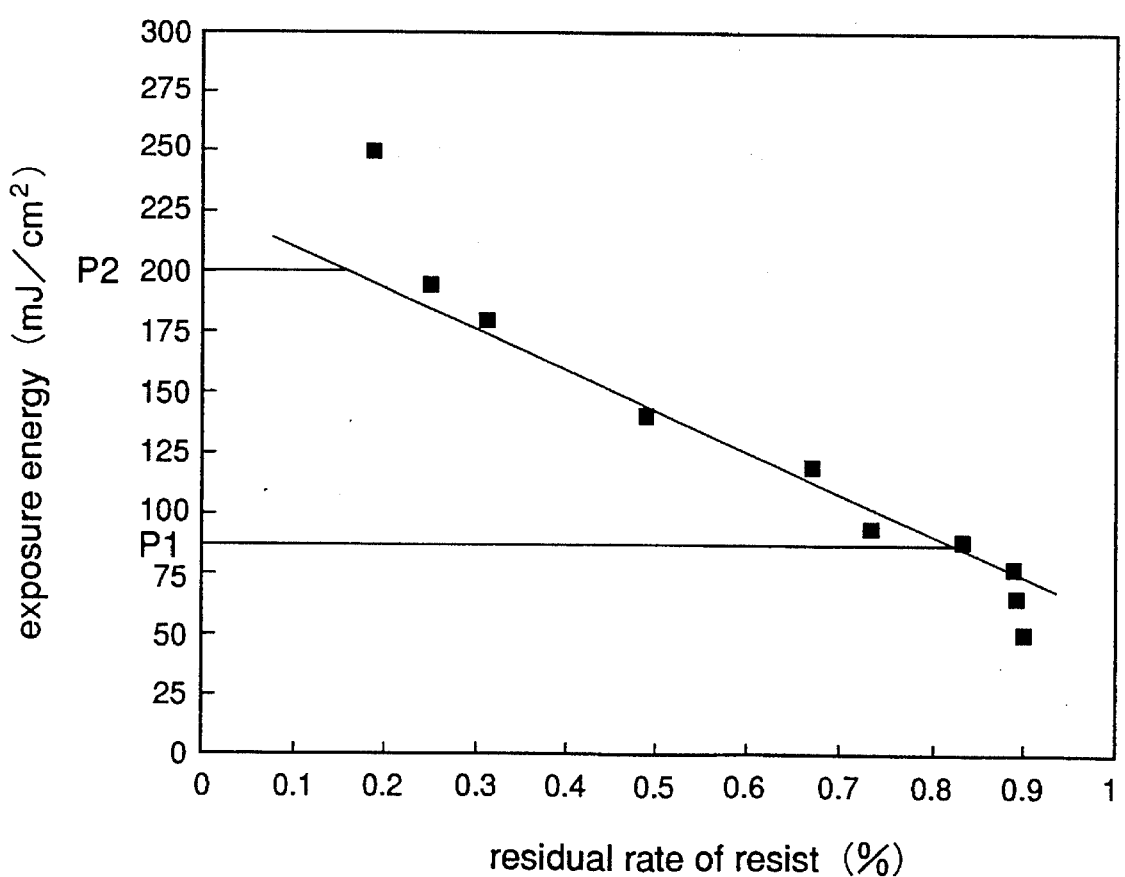
FIG. 6 is a graph illustrating a relationship between exposure energy and residual rate of resist according to the first embodiment of the invention.
Figure 7:
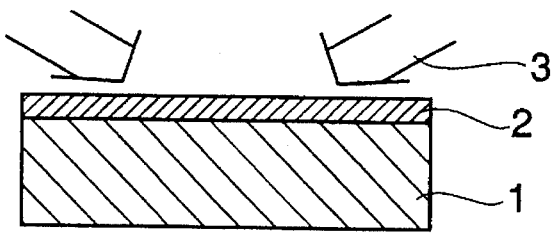
FIGS. 7(a)–7(e) are sectional views illustrating process steps in a method of fabricating a λ/4-shifted diffraction grating according to the prior art.
Figure 7:
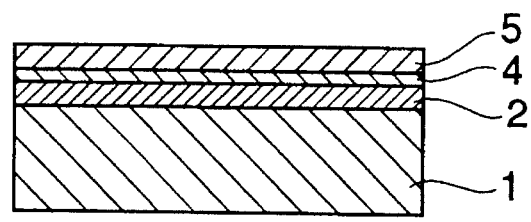
Figure 7:
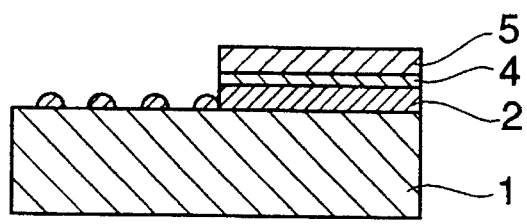
Figure 7:
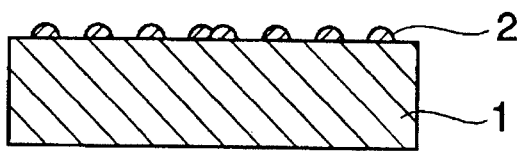
Figure 7:

In the figures, graphs on the left of the sectional views show exposure patterns i.e., patterns of light intensity as a function of position, applied to the image reversible resist 2 in the first region 7 in the corresponding process steps, and graphs on the right of the sectional views show exposure patterns i.e., patterns of light intensity as a function of position, applied to the image reversible resist 2 in the second region 8 in the corresponding process steps. In these right and left graphs, exposure energies at which dissolution of the resist by developing and crosslinking in the resist by heat treatment are possible become shown by dotted lines. However, the exposure energy at which the dissolution of the resist is possible has a range. FIG. 6 is a graph illustrating the relationship between exposure energy and residual rate of resist in a case where MCPR i5000 (trade name of Mitsubishi Kasei Kabushiki Kaisha) is used as a photoresist and NMD-3 (trade name of Tokyo Ouka Kogyo Kabushiki Kaisha) is used as a developer. The thickness of the photoresist is 0.1 μm. The dilution of the developer is 2%, and developing is carried out for twenty seconds. In the figure, the ordinate shows the exposure energy (mJ/cm$^2$) and the abscissa shows the residual rate (%) i.e., how much of the resist is left after developing. In the resist shown in FIG. 6, the exposure energy (P1) at which dissolution of the resist by developing starts is about 90 mJ/cm$^2$, and the exposure energy (P2) at which removal of the resist is completed is about 200 mJ/cm$^2$. A resist with a lower sensitivity provides a wider width between P1 and P2. When a resist with a low sensitivity is employed, the boundary between a region removed by developing and a region remaining after developing is not clear, resulting in an imperfect diffraction grating. Therefore, preferably, a resist having a sensitivity higher than the sensitivity of the resist shown in FIG. 6, i.e., a resist with a lower (P1–P2)/P1 ratio, is employed as the image reversible resist 2.

A description is given of the production process.

Initially, as illustrated in FIGS. 1(a), the image reversible resist 2 is deposited on the semiconductor substrate 1 to a thickness of several hundreds of angstroms to one thousand angstroms and exposed by a two-beam interference exposure method. At this time, the exposure light energy incident on the resist 2 is controlled to be lower than the amount at which dissolution by developing and crosslinking by heat treatment are possible (hereinafter referred to as the dissolution and crosslinking point). In this exposure, the exposure light intensity has a sinusoidal pattern 10, and portions of the resist 2 where the exposure light intensity is higher than an intermediate value, i.e., portions corresponding to crests of the exposure light intensity pattern 10, are referred to as first exposed portions 23. The exposure energy of the image reversible resist 2 is uniform in the first and second regions 7 and 8.

In the step of FIG. 1(b), the image reversible resist 2 in the first region 7 is exposed using a mask (not shown). At this time, the exposure energy is controlled so that it exceeds the dissolution and crosslinking point at the first exposed portions 23 in the first region 7. This second exposure converts the first exposed portions 23 in the first region 7 into portions 21 where the exposure energy exceeds the dissolution and crosslinking point. In addition, portions of the resist 2 other than the portions 21 in the first region 7 are second exposed portions 24 in which the exposure energy does not reach the dissolution and crosslinking point. The width of the second exposed portion 24 is equal to the width of the portion 21. Thereafter, a first developing step is carried out to selectively remove the portions 21 where the exposure energy exceeds the dissolution and crosslinking point.

In the step of FIG. 1(d), the image reversible resist 2 in the first region 7 is exposed using a mask (not shown) so that the first exposed portions 24 are converted into portions 21 where the exposure energy reaches the dissolution and crosslinking point. Further, as illustrated in FIG. 1(e), the image reversible resist 2 in the second region 8 is exposed using a mask. In this exposure, the exposure energy is controlled so that it exceeds the dissolution and crosslinking point at the first exposed portions 23 in the second region 8, which portions 23 are exposed in the interference exposure shown in FIG. 1(a) opposite the crests of the exposure light intensity pattern 10. This exposure process converts the first exposed portions 23 in the second region 8 into portions 21 where the exposure energy exceeds the dissolution and crosslinking point. Further, this exposure process converts portions other than the portions 21 in the second region 8 into third exposed portions 25 where the exposure energy does not reach the dissolution and crosslinking point. The width of the third exposed portion 25 is equal to the width of the portion 21. The process step shown in FIG. 1(e) may be performed before the process step shown in FIG. 1 (d).

In the step of FIG. 1(f), the whole substrate 1 is subjected to heat treatment, whereby crosslinking occurs in the portions 21 of the image reversible resist 2 in the first and second regions 7 and 8 where the exposure energy has exceeded the dissolution and crosslinked point, resulting in crosslinking portions 22. Further, as illustrated in FIG. 1(g), the resist 2 in the second region 8 is exposed to covert the third exposed portions 25 where crosslinking does not occur into developable regions 21, followed by a second developing process. As a result of the developing, a resist pattern in which a pattern in the first region 7 is reversed by $\pi$ from a pattern in the second region 8 is produced. When the semiconductor substrate 1 is etched using the resist pattern as a mask, a $\lambda/4$-shifted diffraction grating as shown in FIG. 1(i) is produced.

The respective exposure steps shown in FIG. 1(b), 1(d), and 1(e) may be performed by automatic alignment with alignment marks on a wafer and an aligner. The alignment process will be described in more detail.

Figure 2:
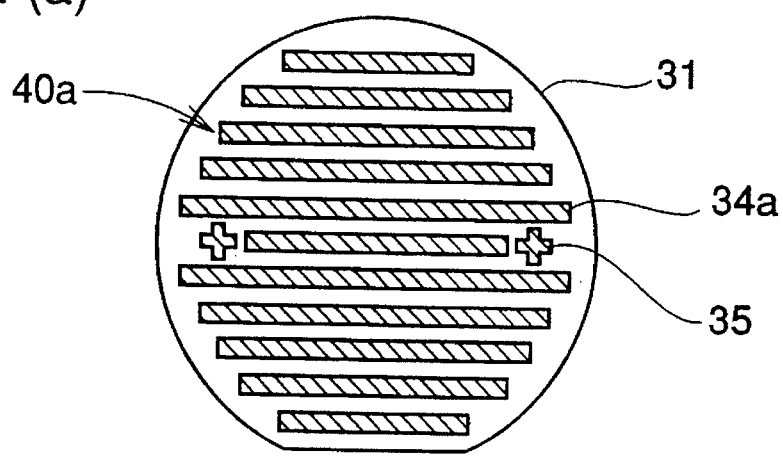
FIGS. 2(a) and 2(b) are plan views illustrating exposure patterns for an image reversible resist used in the production method of a λ/4-shifted diffraction grating according to the first embodiment of the invention.
FIG. 2(c) is a plan view illustrating a cutting pattern of for separating semiconductor substrates from a wafer.
Figure 2:
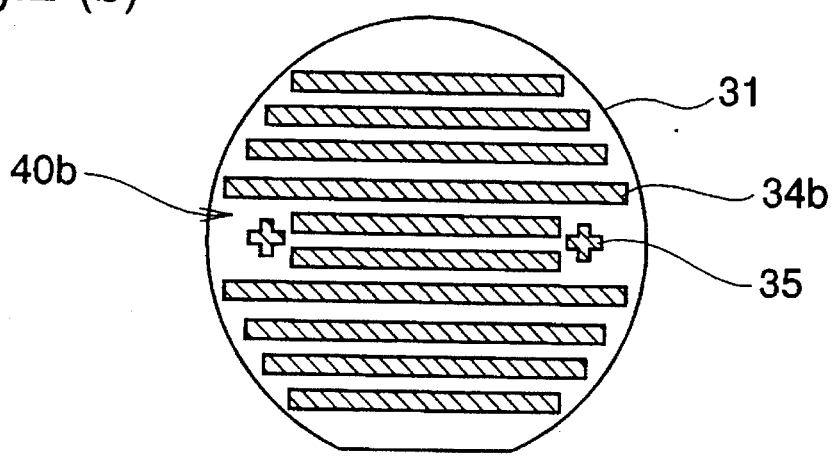
Figure 2:
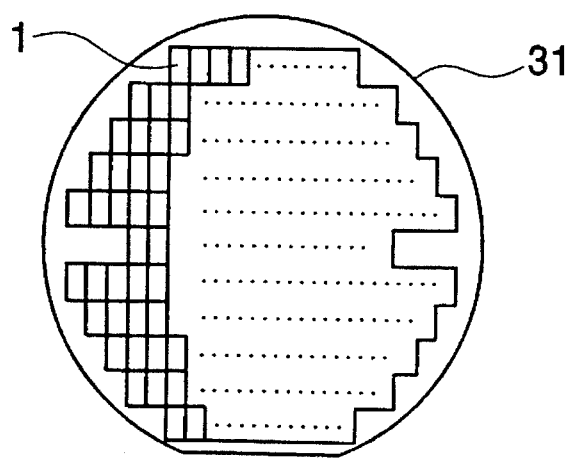

FIGS. 2(a) and 2(b) are plan views illustrating exposure patterns used for the selective exposure steps shown in FIGS. 1(b), 1(d), and 1(e), and FIG. 2(c) is a plan view illustrating a cutting pattern for separating semiconductor substrates 1 from a wafer. In the figures, reference numeral 31 designates a wafer from which the semiconductor substrate 1 is obtained. Reference numerals 40a and 40b designate exposure patterns formed on the wafer 31 using masks. Reference numerals 34a and 34b designate bright parts of the exposure patterns 40a and 40b, respectively. The bright parts 34a of the exposure pattern 40a are arranged at positions on the wafer 31 where the bridge parts 34b of the exposure pattern 40b are absent. The first region 7 of the semiconductor substrate 1 overlaps the bright part 34b of the exposure pattern. Reference numeral 35 designates cruciform alignment mark patterns used for forming alignment marks on the wafer 31. The alignment mark patterns 35 shown in FIGS. 1(a) and 1(b) have the same size and are located at the same positions on the wafer 31.

Initially, in the selective exposure step of FIG. 1(b), alignment marks (not shown) are formed on the wafer 31 using the alignment mark patterns 35 of the exposure pattern 40a shown in FIG. 2(a). Thereafter, the selective exposure in the step of FIG. 1(d) is carried out using the exposure pattern 40a and an aligner so that the alignment marks on the wafer 31 are automatically aligned with the alignment mark patterns 35 of the exposure pattern 40a. Further, the selective exposure in the step of FIG. 1(e) is carried out using the exposure pattern 34b shown in FIG. 2(b) and the aligner so that the alignment marks on the wafer 31 are automatically aligned with the alignment mark patterns 35 of the exposure pattern 34b.

In this way, since the alignment of the exposure patterns 40a and 40b with the wafer is automatically carried out using the alignment marks on the wafer 31 and the alignment mark patterns 35 of the respective exposure patterns, the alignment precision between the wafer and the exposure pattern is significantly increased, whereby highly-precise selective exposure is achieved.

As described above, according to the first embodiment of the invention, a phase-shift pattern is formed in an image reversible resist by exposure of the resist with controlled light intensity, developing, and heat treatment, and a semiconductor layer is etched using the phase-shift pattern as a mask. Therefore, the cover resist 5 and the intermediate layer 4 for preventing mixing of the resists 2 and 5 which are used in the prior art method disclosed in Japanese Published Patent Application No. Hei. 3-61901 can be dispensed with, whereby the production process is significantly simplified compared to the prior art method.

While in the above-described first embodiment a $\lambda/4$-shifted diffraction grating is formed directly in the semiconductor substrate, the diffraction grating may be formed in another layer on the semiconductor substrate, for example, an insulating film. Alternatively, the diffraction grating may be formed in a semiconductor layer or a multilayer semiconductor structure that is disposed on a semiconductor substrate and has a composition different from the composition of the semiconductor substrate.

EMBODIMENT 2.

Figure 3:
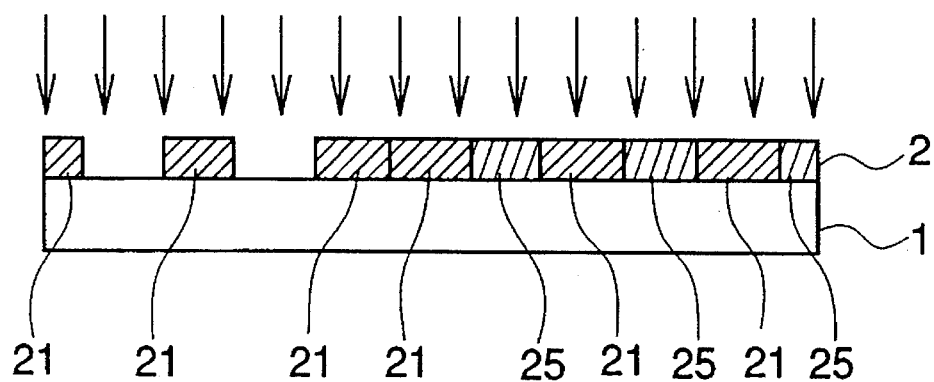
FIG. 3 is a sectional view illustrating a major process step in a method of fabricating a λ/4-shifted diffraction grating in accordance with a second embodiment of the present invention.

FIG. 3 is a sectional view illustrating a major process step in a method of producing a $\lambda/4$-shifted diffraction grating according to a second embodiment of the present invention. In this second embodiment, a whole image exposure step is employed in place of the selective exposure steps of the first embodiment shown in FIGS. 1(d) and 1(e). In FIG. 3, the same reference numerals as in FIGS. 1(a)–1(e) designate the same or corresponding parts.

The production method according to the above-described first embodiment includes two selective exposure steps (FIGS. 1(d) and 1(e)) for forming the crosslinked portions in the first and second regions. In this second embodiment, however, after the step of FIG. 1(c), the surface of the semiconductor substrate 1 is subjected to whole image exposure so that the exposure energies of the first exposed portions 23 and the second exposed portion 24 exceed the crosslinking point, thereby forming exposed portions 21 in which the exposure energy exceeds the crosslinking point (FIG. 3). Therefore, in the subsequent heat treatment, crosslinking occurs in these exposed portions 21. Thereafter, a $\lambda/4$-shifted diffraction grating is completed according to the process steps already described with respect to FIGS. 1(f)–1(i).

The whole image exposure step shown in FIG. 3 may be performed by an automatic alignment with alignment marks on a wafer and an aligner. The alignment process will be described in more detail.

Figure 4:
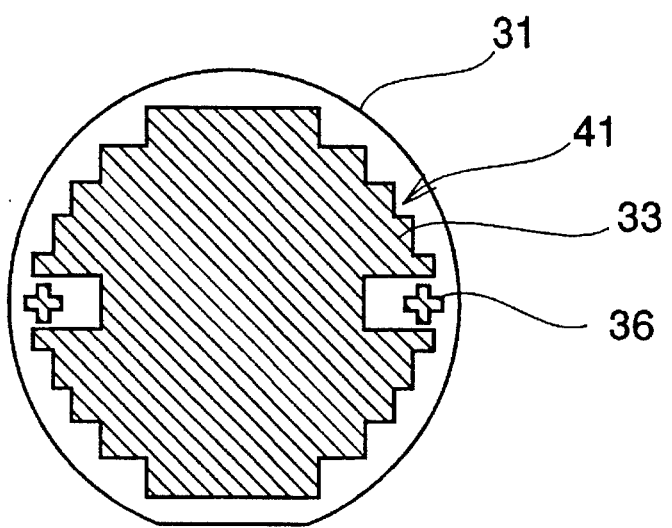
FIG. 4 is a plan view illustrating an exposure pattern of an image reversible resist used in a production method of a λ/4-shifted diffraction grating according to the second embodiment.

FIG. 4 is a plan view illustrating an exposure pattern used in the whole image exposure step shown in FIG. 4. In FIG. 4, the same reference numerals as in FIGS. 2(a)–2(c) designate the same or corresponding parts. Reference numeral 41 designates an exposure pattern and numeral 33 designates a bright part of the exposure pattern 41. The exposure pattern 41 covers the entire region of the wafer 31 from which a plurality of semiconductor substrates are taken. Reference numeral 36 designates alignment mark patterns of the exposure pattern 41. The alignment mark patterns 36 have the same size and are located at the same positions on the wafer 31 as the alignment mark patterns 35 of the exposure pattern 40a shown in FIG. 2(a).

After the selective exposure step using the exposure pattern 40a shown in FIG. 2(a) (FIG. 1(b)), the whole image exposure shown in FIG. 3 is carried out using the exposure pattern 41 shown in FIG. 4 so that the cruciform alignment mark patterns 36 are automatically aligned with the alignment marks on the wafer 31 using an aligner. In this way, since the exposure is carried out using the alignment marks, the alignment precision between the wafer and the exposure pattern is significantly increased as in the above-described first embodiment.

Figure 5:
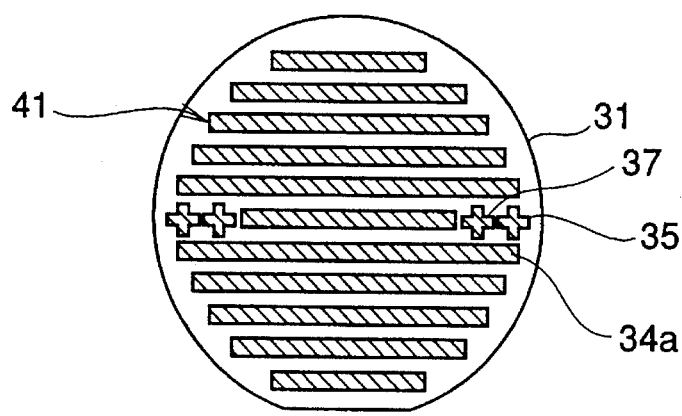
FIG. 5 is a plan view illustrating an exposure pattern of an image reversible resist used in a production method of a λ/4-shifted diffraction grating according to a variation of the second embodiment.

Since alignment marks on the wafer 31 get out of shape during wafer processing, if positioning or alignment is performed on the wafer 31 after formation of the diffraction grating, additional alignment marks for the positioning or alignment should be formed on the wafer. More specifically, as shown in FIG. 5, additional alignment mark patterns 37 are formed toward the center of the wafer from the alignment mark patterns 35 of the exposure pattern 41 and, using the alignment mark patterns 37, additional alignment marks for the positioning or alignment after the formation of the diffraction grating are formed on the wafer.

According to the second embodiment of the present invention, since two selective exposure steps in the above-described first embodiment are replaced with a whole image exposure step, the production processing is simplified.

What is claimed is:

1. A method of producing a λ/4-shifted diffraction grating comprising:

depositing an image reversible resist on a substrate in which a diffraction grating is to be formed;

exposing the image reversible resist to an interference pattern having a light intensity pattern including a plurality of crests of maximum light intensity such that the exposed resist is not dissolved when developed;

exposing the resist on a first region of the substrate to an interference pattern having a light intensity pattern including a plurality of crests of maximum light intensity so that only portions of the resist exposed to the maximum light intensity are dissolved when developed;

developing the resist on the first region of the substrate;

exposing portions of the resist on the first region of the substrate remaining after the developing to light of sufficient intensity so that image reversal occurs in these portions when subjected to image reversal baking;

exposing the resist on a second region of the substrate adjacent the first region to a light intensity pattern including a plurality of crests of maximum light intensity so that only portions of the resist exposed to the maximum light intensity are sufficiently exposed so that image reversal occurs in these portions when subjected to image reversal baking;

image reversal baking the image reversible resist on the first and second regions of the substrate;

exposing and developing the resist on the first and second regions of the substrate to remove portions in which image reversal did not occur, thereby forming a resist pattern; and etching the substrate using the resist pattern as a mask.

2. A method of producing a λ/4-shifted diffraction grating comprising:

depositing an image reversible resist on a substrate in which a diffraction grating is to be formed;

exposing the image reversible resist to an interference pattern having a light intensity pattern including a plurality of crests of maximum light intensity such that the exposed resist is not dissolved when developed;

exposing the resist on a first region of the substrate to an interference pattern having a light intensity pattern including a plurality of crests of maximum light intensity so that only portions of the resist exposed to the maximum light intensity are dissolved when developed;

developing the resist on the first region of the substrate;

exposing portions of the resist on the first region of the substrate remaining after developing and the resist on a second region of the substrate adjacent the first region to an interference pattern having a light intensity pattern including a plurality of crests so that only portions of the resist exposed to the maximum light intensity are sufficiently exposed so that image reversal occurs in these portions when subjected to image reversal baking;

image reversal baking the image reversible resist on the first and second regions of the substrate;

exposing and developing the resist on the first and second regions of the substrate to remove portions in which image reversal did not occur, thereby forming a resist pattern; and etching the substrate using the resist pattern as a mask.

3. The method of claim 1 comprising:

forming an alignment mark on a wafer including the substrate by exposure when exposing the image reversible resist on the first region of the substrate; and performing the subsequent exposure steps using the alignment mark.

* * * * *